(12) United States Patent  
Nakano et al.

(10) Patent No.: US 7,595,974 B2  
(45) Date of Patent: Sep. 29, 2009

(54) LAYERED CERAMIC CAPACITOR

(75) Inventors: Yukie Nakano, Tokyo (JP); Takeshi Nomura, Tokyo (JP); Yasutaka Taguchi, Tokyo (JP)

(73) Assignee: TDK Corporation, Tokyo (JP)

( * ) Notice: Subject to any disclaimer, the term of this patent is extended or adjusted under 35 U.S.C. 154(b) by 167 days.

(21) Appl. No.: 10/580,005

(22) PCT Filed: Nov. 22, 2004

(86) PCT No.: PCT/JP2004/017360

§ 371 (c)(1),  
(2), (4) Date: Feb. 22, 2007

(87) PCT Pub. No.: WO2005/050679

PCT Pub. Date: Jun. 2, 2005

(65) Prior Publication Data

US 2007/0139861 A1 Jun. 21, 2007

(30) Foreign Application Priority Data

Nov. 21, 2003 (JP) .............................. 2003-391661

(51) Int. Cl.  
*H01G 4/06* (2006.01)  
*H01G 4/008* (2006.01)  
(52) U.S. Cl. ..................................... 361/321.4; 361/305  
(58) Field of Classification Search ... 361/321.1–321.5, 361/311, 305  
See application file for complete search history.

(56) References Cited

U.S. PATENT DOCUMENTS 5,862,034 A * 1/1999 Sato et al. ................ 361/321.5  
2002/0137622 A1 * 9/2002 Tokita et al. ................ 501/137

FOREIGN PATENT DOCUMENTS

| JP | 08-236386 | | 9/1996 |
| JP | 2001167631 A | * | 6/2001 |
| JP | 2003-277139 | | 10/2003 |
| JP | 2003-309036 | | 10/2003 |

* cited by examiner

*Primary Examiner*—Eric Thomas  
(74) *Attorney, Agent, or Firm*—Oblon, Spivak, McClelland, Maier & Neustadt, P.C.

(57) ABSTRACT

A multilayer ceramic capacitor having a high dielectric constant, a large capacitance and a high reliability can be obtained by controlling a value of residual stress in it.

20 Claims, 2 Drawing Sheets

LAYERED CERAMIC CAPACITOR

FIELD OF THE INVENTION

The present invention relates to a multiplayer (layered) ceramic capacitor, and more particularly, to a small-sized (i.e., miniaturized) multilayer ceramic capacitor having thin dielectric layers capable of achieving a high dielectric constant and a large capacitance.

BACKGROUND ART

A multilayer ceramic capacitor has been widely utilized as an electric parts having small size and large capacitance with high reliability, and a plurality of such multilayer ceramic capacitors have been arranged in an electronic equipment In recent years, there it has been required for the electronic equipment to provide a small-sized and a high reliability, and such requirement has also been desired for the multilayer ceramic capacitor so as to realize a down-sizing, a large capacitance, a low price and a high reliability.

The multilayer ceramic capacitor includes a layered dielectric body which is formed by alternately laminating dielectric layers and internal electrode layers external electrodes. Such layered dielectric body is formed by laminating two kinds of raw material layers i.e., one of the internal electrode layers and the other of the dielectric layers alternately, and simultaneously sintering the two kinds of the raw material layers together. Accordingly it is required for the raw material of the internal electrode layer to have a property not reactive to the raw material of the dielectric layer even if both raw material layers are sintered. For this reason, in a prior art, a noble metal such as platinum (Pt) or palladium (Pd) has been used for a material of the internal electrode layer. In recent years, in accordance with the increasing the need of large capacitance, it has been required for the multilayer ceramic capacitor to be incorporated with increasing number of the internal electrode layers. However, such noble metal is expensive and the use thereof is hence not reasonable in terms of cost.

In order to eliminate such a defective, it is realized that nickel (Ni), a cheep base metal material, is utilized as the material of the internal electrode layers, and there has been developed a dielectric material capable of being sintered in a reducing atmosphere in which the nickel is not oxidized and a sintering condition. As a result, remarkable cost-down in manufacturing such multilayer ceramic capacitor can be realized.

As mentioned above, according to the requirement for the electronic equipment to have a small-sized or miniaturized structure and the high reliability, it is also required for the multilayer ceramic capacitor as an electronic element to have a small-sized structure. However, the small-sized structure of the multilayer ceramic capacitor will result in a reduction of effective area.

The capacitance is generally expressed as this equation:

$$C = \epsilon_o \times \epsilon_s \times n \times S/d$$

wherein C: capacitance (F); n: number of effective dielectric layers; $\epsilon_o$: dielectric constant in vacuum condition; $\epsilon_s$: relative dielectric constant; S: effective area (m$^2$); d: thickness of dielectric layer(m).

In order to obtain substantially the same capacitance even if the multilayer ceramic capacitor is down sizing, it will be apparent from the above equation that it is essential to make thin dielectric layer and to increase the number of dielectric layers. However, a structural defect may easily occur by making thinning of the dielectric layer, and increasing the number of the laminated dielectric layers. This problem becomes prominent with increasing the number of the laminated dielectric layers, and much severe in recent technology in which the thickness of the dielectric layer becomes thinner and the number of the laminated dielectric layers becomes increased to satisfy the requirement of the small-sized structure and large capacitance thereof.

In order to solve such problems, various countermeasures have been considered and searched in various directions. For example, Japanese Unexamined Patent Publication (KOKAI) No. HEI 8-236386 shows a technology for improving mechanical strength by reducing compression residual stress to a value not more than 50 MPa. Another Japanese Unexamined Patent Publication No. WO 01-033588 discloses a technology of controlling expansion coefficients of the layered dielectric body in the laminating direction and the width direction thereof to be within predetermined ranges, respectively, by adjusting the amount of components in the internal electrodes to thereby prevent cracks and reduce defective fraction.

DISCLOSURE OF THE INVENTION

The present invention was conceived in consideration of the circumstances encountered in making thin the dielectric layer and increasing the layered number of the dielectric layers with the miniaturization of the multilayer ceramic capacitor. An object of the present invention is to provide a multilayer ceramic capacitor having a large capacitance and a high reliability.

The inventors of the subject application were found, during study of the relation between properties or the like of the multilayer ceramic capacitor and structural defects or the like causing in a case where the dielectric layer was made thin and the number of the dielectric layers was increased, that there was significant relationship between a stress remaining in the multilayer ceramic capacitor and a dielectric constant, and according such finding, the inventors completed the present invention. That is, the inventors found that in the case where the multilayer ceramic capacitor has a residual stress of a value not less than a certain value, the dielectric constant of such multilayer ceramic capacitor becomes high and a large capacitance is obtained.

The present invention was conceived on the basis of the above knowledge in the following aspects.

In first aspect there is provided a multilayer ceramic capacitor comprises a layered dielectric body composed by alternately dielectric layers and internal electrode layers, and a pair of external electrodes are connecting to the internal electrodes alternately at the both end of the layered dielectric body, where in a tension stress remains in a direction of an electric field remains at a exposed face parallel to the direction of the electric field inside the layered dielectric body and the tension stress calculated by an X-ray diffraction measurement is a value not less than 50 MPa.

According to this first aspect, since the tension stress in a direction of an electric field at a face parallel to the direction of the electric field inside the layered dielectric body, as a result, the multilayer ceramic capacitor obtained high dielectric constant and provide a large capacitance. In general, the tension stress is expressed as plus value.

In second aspect, there is provided a multilayer ceramic capacitor comprises a layered dielectric body composed by alternately dielectric layers and internal electrode layers, and a pair of external electrodes are connecting to the internal electrodes alternately at the both end of the layered dielectric body, wherein a compression stress in a direction connecting both the external electrodes remains at a exposed face parallel to the direction of the electric field inside the layered dielectric body and the compression stress calculated by an X-ray diffraction measurement is a value not less than 50 MPa.

According to this second aspect, since the compression stress in the direction connecting both the external electrodes remains at a exposed face parallel to the direction of the electric field inside the layered dielectric body, as a result, the multilayer ceramic capacitor obtained by using such layered dielectric body having a high dielectric constant and provide a large capacitance. In general, the compression stress is expressed as minus value.

In third aspect, there is provided a multilayer ceramic capacitor comprises a layered dielectric body composed by alternately dielectric layers and internal electrode layers, and a pair of external electrodes are connecting to the internal electrodes alternately at the both end of the layered dielectric body, wherein a compression stress in a direction connecting both the external electrodes remains at an outer surface perpendicular to the electric field direction of the layered dielectric body, and the compression stress calculated by an X-ray diffraction measurement is a value not less than 100 MPa.

According to this third aspect, since the compression stress in the direction connecting both the external electrodes remains at an outer surface perpendicular to the electric field direction of the layered dielectric body, as a result, the multilayer ceramic capacitor obtained such layered dielectric body having a high dielectric constant and provide a large capacitance.

In fourth aspect, there is provided a multilayer ceramic capacitor comprises a layered dielectric body composed by alternately dielectric layers and internal electrode layers, and a pair of external electrodes which are connected to the internal electrodes alternately at the both end of the layered dielectric body, wherein a stress remains at the outer surface of layered dielectric body in a direction of perpendicular to the electric field direction, and the stress in a direction connecting both external electrodes is satisfied next equation, $LS=-Ln(n) \times B$ and $10 \leq B \leq 300$, in which n: number of dielectric layers; B: constant of proportion; LS: a value of the stress in a direction connecting to the both external electrodes at an outer surface of the layered dielectric body perpendicular to the direction of electric field therein calculated by an X-ray diffraction measurement; and Ln: natural logarithm.

According to this fourth aspect, since the equations $LS=-Ln(n) \times B$ and $10 \leq B \leq 300$ are satisfied in the described conditions, as a result, the multilayer ceramic capacitor obtained by using such layered dielectric body can provide a high dielectric constant and a large capacitance.

In the further preferred embodiment of above respective aspects, the internal electrode layer is formed of nickel or nickel alloy and a material powder for forming the internal electrode layer has an average particle size of not more than 0.5 μm, preferably of not more than 0.3 μm, and more preferably of not more than 0.15 μm According to such embodiment, the sintering temperature at the time of forming the internal electrode layers is lowered, and hence, the temperature difference from the sintering temperature of the dielectric layers can be made large as well as the difference in contraction coefficient. As a result, a further large residual stress can be provided to the multilayer ceramic capacitor of the above aspects, which can provide a high dielectric constant and a large capacitance.

In the other preferred embodiment, the dielectric layer between two internal electrode layers has a thickness of not more than 5 μm and more preferably of not more than 2 μm.

According to this embodiment, the thickness of the dielectric layer has small difference in thickness from that of the internal electrode layer. Accordingly, the effect due to the difference in the sintering behavior between the dielectrics and the internal electrode material (Ni or Ni alloy) can be remarkably attained, so that the large residual stress can be obtained, and as a result, the multilayer ceramic capacitor having a high dielectric constant can be obtained.

In further preferred embodiments, the dielectric layer may contain, as main component, a barium titanate. The dielectric layer may further contain sintering aids which includes $SiO_2$ as main component and at least one component selected from oxides of M (M: at least one kind of element selected from the groups of Ba, Ca, Sr and Mg), lithium oxide and boron oxide.

The dielectric layer may further contain, as sub-components, which include at least one first-sub-component selected from the groups of magnesium oxide, calcium oxide, barium oxide, strontium oxide, and chromium oxide and at least one second-sub-component selected from oxides of R1 (R1: Sc, Er, Tm, Yb, Lu, Y, Dy, Ho, Tb, Gd or Ru). The dielectric layer may further contain at least one third-sub-component selected from the groups of vanadium oxide, molybdenum oxide, and tungsten oxide, and may further include at least one fourth-sub-component selected from the groups of manganese oxide and chromium oxide.

According to such embodiment, in the case where the average particle size of the material powder for forming the internal electrode layer is made smaller than that of the barium titanate as the main component of the material powder for forming the dielectric layer, the difference in their sintering behaviors would enlarge, so that the large residual stress would remain after the sintering process.

As mentioned above, according to the multilayer ceramic capacitor of the present invention of the characteristics mentioned above, as the residual stress becomes large, the dielectric constant also large. Thus, the multilayer ceramic capacitor having a large residual stress can provide a large capacitance and, hence, the multilayer ceramic capacitor can be miniaturized. Furthermore, according to the present invention, by utilizing the difference in the sintering behaviors between the dielectric layer and the internal electrode layer, a large residual stress can be provided to the multilayer ceramic capacitor, and as a result, a high dielectric constant and a large capacitance can be realized, thus being advantageous.

The nature and further characteristic features of the present invention will be made clearer from the following descriptions made with reference to the accompanying drawings and the experiments carried out.

BEST MODE FOR EMBODYING THE INVENTION

A preferred embodiment of a multilayer ceramic capacitor according to the present invention will be described hereunder with reference to the accompanying drawing.

Figure 1:
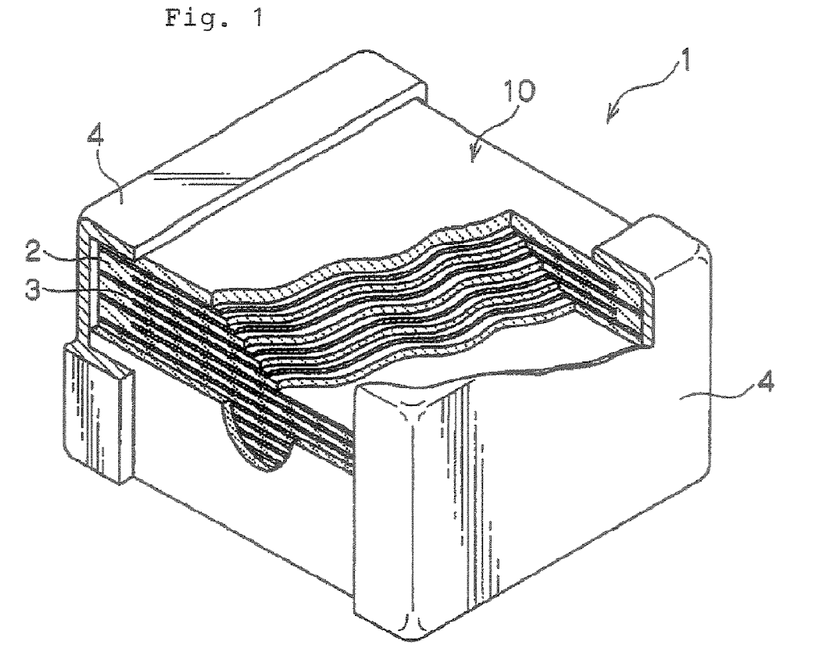
FIG. 1 is a perspective view, partially cut away, of a multilayer ceramic capacitor according to the present invention.
Figure 2:
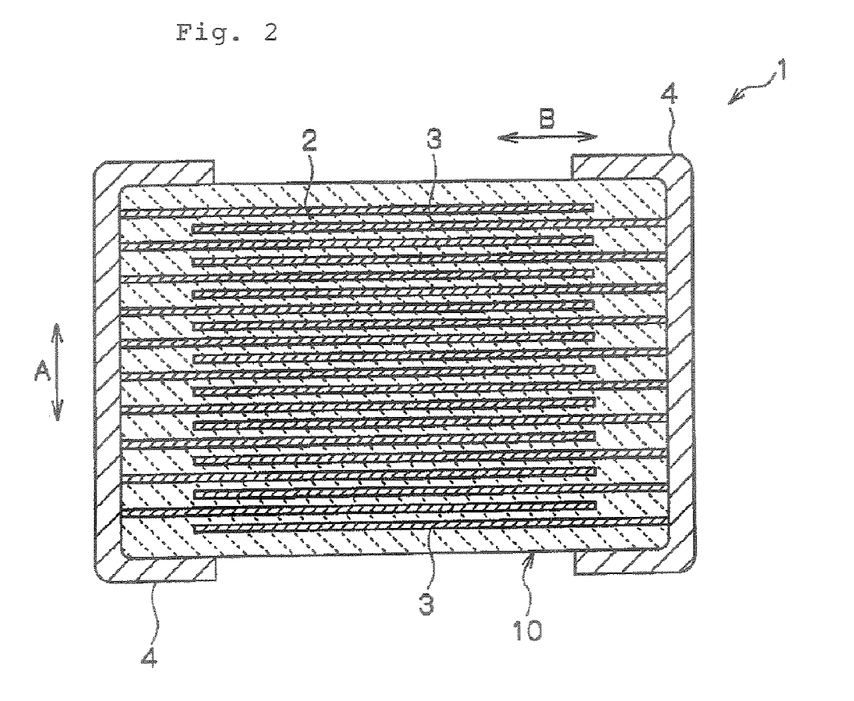
FIG. 2 is a sectional view showing a basic structure of the multilayer ceramic capacitor according to the present invention.

As shown in FIGS. 1 and 2, the multilayer ceramic capacitor 1 according to the present invention comprises a layered dielectric body 10 composed by alternately dielectric layers 2 and internal electrode layers 3, and a pair of external electrodes 4 which are connected to the internal electrodes 2 alternately at the both end of the layered dielectric body 10.

The layered dielectric body 10 has generally a rectangular parallelepiped shape, but it is not limited to such shape, and although dimensions thereof is also not specifically limited, but in a usual design, the dimensions may be (long length side: about 0.4 to 5.6 mm)×(short length side: about 0.2 to 5.0 mm)×(height of about 0.2 to 1.9 mm).

[Dielectric Layer]

Each dielectric layer 2 contains a barium titanate, as main component, a sintering aids and other sub-components. As the sintering aids, a composition including mainly silicon oxide and at least one component selected from oxides of M (M: at least one kind of element selected from the groups of Ba, Ca, Sr and Mg), lithium oxide and boron oxide. As the sub-components, at least one first-sub-component selected from the groups of magnesium oxide, calcium oxide, barium oxide, strontium oxide, and chromium oxide, and at least one second-sub-component selected from oxides of R1 (R1: Sc, Er, Tm, Yb, Lu, Y, Dy, Ho, Tb, Gd or Ru) may be contained. The dielectric layer 2 may further contain at least one third-sub-component selected from the groups of vanadium oxide, molybdenum oxide, and tungsten oxide, and may further include at least one fourth-sub-component selected from the groups of manganese oxide and chromium oxide.

The dielectric layer 2 may contain various sintering aids and sub-components other than the main component of barium titanate. A preferable composition of the sintering aids and sub-components may include magnesium oxide, yttrium oxide, barium oxide, calcium oxide, silicon oxide, manganese oxide, vanadium oxide, and molybdenum oxide. When all of the components were stoichiometrical oxide, content ratios of the sintering aids and the sub-components with respect to 100 mol of $BaTiO_3$ are preferably set to the following ranges. Namely, for example, the content of MgO is set to a range of 0.1 to 3 mol, the content of $Y_2O_3$ is set to a range of exceeding 0 mol to 5 mol or less, the total content of BaO and CaO is set to a range of 2 to 12 mol, the content of $SiO_2$ is set to a range of 2 to 12 mol, the content of MnO is set to a range of exceeding 0 mol to 0.5 mol or less, the content of $V_2O_5$ is set to a range of 0 to 0.3 mol, the content of $MoO_3$ is set to a range of 0 to 0.3 mol, and total content of $V_2O_5$ and $MoO_3$ is set to a range exceeding 0 mol.

Oxidation states of the respective oxides are not specifically defined or limited, and the respective oxides in which ratios of metal elements constituting the respective oxides are within the above-prescribed ranges would be utilized. Each dielectric layer 2 may further include at least one other compound of an amount within a range capable of achieving the object and attaining the function and effect of the present invention.

The containing amounts (contents) of the sintering aids and sub-components mentioned above are determined by the following reasons.

(1) In a case where the content of magnesium oxide is less than the amount described above, a temperature dependence of capacitance of the multilayer ceramic capacitor 1 becomes large. On the other hand, in a case where the content of magnesium oxide is more than the amount described above, the degree of sintering is drastically deteriorated, and insufficient compaction of the dielectric layer 2 is obtained. This result shortens the IR accelerated life time.

(2) Yttrium oxide has a function of improving the IR accelerated life time and also improving a direct current bias characteristics of the multilayer ceramic capacitor 1. In a case of less content of the yttrium oxide, no sufficient effect is obtainable by the addition of the yttrium oxide. On the other hand, in a case of the content of the yttrium oxide exceeding the range described above, the relative dielectric constant is decreased, and any sufficient compaction of the dielectric layer 2 is not obtainable because of deterioration of the degree of sintering.

(3) In a case where the total content of barium oxide and calcium oxide is less than the range described above, a large with-time-change in capacitance under an impression of a direct current field occurs, the sufficient IR accelerated life time is not obtainable, and it becomes difficult to make temperature characteristics of the capacitance within a desired range. On the other hand, in a case where the total content of barium oxide and calcium oxide exceeds the range described above, the IR accelerated life time becomes insufficient and the relative dielectric constant is drastically lowered.

(4) In a case where the content of silicon oxide is less than the range described above, the degree of sintering is lowered, and no sufficient compaction of the dielectric layer 2 is obtainable. On the other hand, in a case where the content of silicon oxide exceeds the range described above, an initial insulating resistance of the multilayer ceramic capacitor 1 becomes too low.

(5) The manganese oxide has functions of making compact the dielectric layer 2 and improving the IR accelerated life time. However, in a case where the manganese oxide is too much contained, it becomes difficult to make small the capacitance aging under an impression of a direct current field.

(6) Each of the vanadium oxide and the molybdenum oxide can improve the capacitance aging under an impression of a direct current field. In addition, the vanadium oxide can improve a breakdown voltage and the molybdenum oxide can improve the IR accelerated life time. In a case where at least one of the vanadium oxide and the molybdenum oxide is too much contained, an initial insulation resistance will be extremely lowered.

(7) The dielectric layer 2 may contain aluminum oxide. The aluminum oxide can help to sinter at a relatively low temperature. It is desirable that the content of the aluminum oxide in a compound of $Al_2O_3$ is not more than 1 weight % of the dielectric layer 2. In a case of too much content of the aluminum oxide, the relative dielectric constant is extremely lowered and the IR accelerated life time is simultaneously shortened.

An average crystal grain size of the dielectric layer 2 is not more than 0.6 μm or, preferably, not more than 0.45 μm, and more preferably, not more than 0.25 μm. In the case of the average crystal grain size of the dielectric layer 2 being not more than 0.6 μm, the capacitance aging becomes small, and the IR accelerated life time can be improved. Particularly, in the case of not more than 0.45 μm, an anisotropy of the crystal becomes small, and hence, the capacitance aging becomes small further. In the case of not more than 0.25 μm, the IR accelerated life time can be further improved. Although the crystal grain size has no lower limit, in order to make small the average crystal grain size, it is necessary to use an extremely small-sized dielectric material powder, which, however, becomes difficult to prepare a paste of the powder. For this reason, usually, it is desired to make the average crystal grain size to be not less than 0.05 μm. The average crystal grain size is obtained by grinding the dielectric layer 2, etching chemically or thermally the ground surface of the dielectric layer 2 and then calculating based on planimetoric method by using an image taken by a scanning electron microscope.

The thickness of each of the dielectric layers 2 is not specifically limited. A high dielectric constant can be obtained by applying the present invention in the case of the thickness of not more than 5 μm, and even in the case of not more than 2 μm. When dielectric layer 2 were formed by a printing method, the lower limit of the thickness is usually of about 0.5 μm. The number of lamination of the dielectric layers 2 is usually of about 2 to 1500. In the present invention, more available effects can be attained in the case of the lamination number of not less than 50 layers, and preferably, of not less than 100 layers

[Internal Electrode]

The internal electrode layers 3 are laminated in a manner that every one layers 3 are expose one end surface thereof to one of opposing two end surfaces of the layered dielectric body 10, another every one layers 3 are expose one end surface thereof to another one of opposing two end surfaces of the layered dielectric body 10. One external electrode 4, which will be explained to herein later, is formed on the one end surface of the dielectric element body 10 and connected to the exposed surfaces of the every one internal electrodes 3. The other external electrode 4, which will be explained to here in later, is formed on the other end surface of the dielectric element body 10 and connected to the exposed surfaces of the other every one internal electrodes 3. Thus, the internal electrodes 3 and the external electrodes 4 configure a part of the multilayer ceramic capacitor 1.

Although a conductive material constituting the inner electrode 3 is not specifically limited, a base metal is usable because the constituting material of the dielectric layer 2 has a reducing-resistant performance. Nickel or nickel alloy will be preferably utilized as base metal for the conductive material of the internal electrode 3. Further, it may be possible to add a material having the same composition as the main component of the dielectric material of the dielectric layer 2 or the same composition as that thereof of an amount of not more than 30 weight % in the conductive material of nickel or nickel alloy. In such case, it is desired that the average particle size of the main component of the dielectric material or the same composition as that thereof is less than the average particle size of nickel or nickel alloy in raw material powder of the internal electrode layer 3. The thickness of the internal electrode layer 3 may be determined as occasion demands in accordance with objects of use of the multilayer ceramic capacitor 1, but usually, the thickness of 0.2 to 2.5 μm, more preferably, of 0.4 to 1.5 μm, will be desired.

The internal electrode layers 3 are manufactured by sintering powder of raw constituting material, and in the present invention, a difference in a sintering behavior between the internal electrode layers 3 and the dielectric layers 2 becomes large, and after the sintering process, it is presumed that a large residual stress remains. As the powder of raw material for forming the internal electrode layers 3, it is desired to use powder of nickel or nickel alloy having average particle size of not more than 0.5 μm and preferably, of not more than 0.25 μm.

In the case of the average particle size of nickel or nickel alloy of not more than 0.5 μm in the raw material powder, the sintering temperature at a time of forming the internal electrode layers 3 is lowered, and hence, differences in contraction behavior and/or contraction percentage between the dielectric layers 2 and the internal electrode layers 3 can be made large. In such case, it is desired for the difference in the sintering temperature between the internal electrode layers 3 and the dielectric layers 2 to be about 200 to 800 degrees of C. By sintering the raw material powder of the average particle size mentioned above, a large residual stress is applied to the multilayer ceramic capacitor 1, and as a result, the multilayer ceramic capacitor 1 having a high dielectric constant and a high capacitance can be obtained. The average particle size is calculated under a scanning electronic microscope examination.

[External Electrode]

The external electrodes 4 are electrodes respectively electrically conductive to the internal electrode layers 3 arranged in the Layered dielectric body 10 and consisting of a pair of electrodes. One of the external electrode 4 is formed on one end portion of the dielectric element body 10, and the other external electrode 4 is formed on the other end portion of the dielectric element body 10. Although an electrically conductive material contained in the external electrodes 4 is not specifically limited, in the preferred embodiment of the present invention, cheep nickel (Ni), copper (Cu) or their alloys may be utilized. The thickness of the external electrode 4 may be optionally determined as occasion demands in accordance with the use of the multilayer ceramic capacitor 1, and in usual, the thickness is preferably of about 10 to 50 μm.

[Residual Stress]

The multilayer ceramic capacitor according to the present invention has the structure mentioned above and is characterized by being provided with one or two or more of the following aspects.

That is, the first aspect resides in that a tension stress in a direction of an electric field (direction of arrow A in FIG. 2) at a exposed face parallel to the direction of the electric field inside the layered dielectric body and the tension stress calculated by an X-ray diffraction measurement is a value not less than 50 MPa.

The second aspect resides in that a compression stress in a direction connecting both the external electrodes 4 (direction of arrow B in FIG. 2) at a exposed face parallel to the direction of the electric field inside the layered dielectric body 10, and the compression stress calculated by an X-ray diffraction measurement is not less than 50 MPa.

The third aspect resides in that a compression stress in the direction connecting to the both the external electrodes remains at an outer surface perpendicular to the electric field direction of the layered dielectric body 10, and the compression stress calculated by an X-ray diffraction measurement is a value not less than 100 MPa.

The fourth aspect resides in that the following equations are satisfied $$LS = -Ln(n) \times B, \quad 10 \leq B \leq 300$$

Wherein n: number of dielectric layers; B: constant of proportion; LS: a value of a residual stress in a direction connecting to the both external electrodes at an outer surface of the layered dielectric body 10 perpendicular to the direction of the electric field therein calculated by an X-ray diffraction measurement; and Ln: natural logarithm.

The multilayer ceramic capacitor according to the present invention will be described more in detail hereunder in connection with these aspects, respectively.

(1) First Aspect

In the multilayer ceramic capacitor 1 of this first aspect, a tension stress in a direction of an electric field remains at a face parallel to the direction of the electric field inside the layered dielectric body and the tension stress calculated by an X-ray diffraction measurement is a value not less than 50 MPa. Since a value of the tension stress changes in accordance with the size of the layered dielectric body 10 constituting the multilayer ceramic capacitor 1 and the number of layers thereof the range of the value of the tension stress is not definitively prescribed. But in the case of the tension stress of not less than 50 MPa in the direction of the electric field, the dielectric constant of the multilayer ceramic capacitor 1 becomes high and the capacitance becomes large. In the case of the tension stress of less than 50 MPa, there may cause a case that the dielectric constant becomes low and a desired capacitance is not obtainable.

Figure 3:
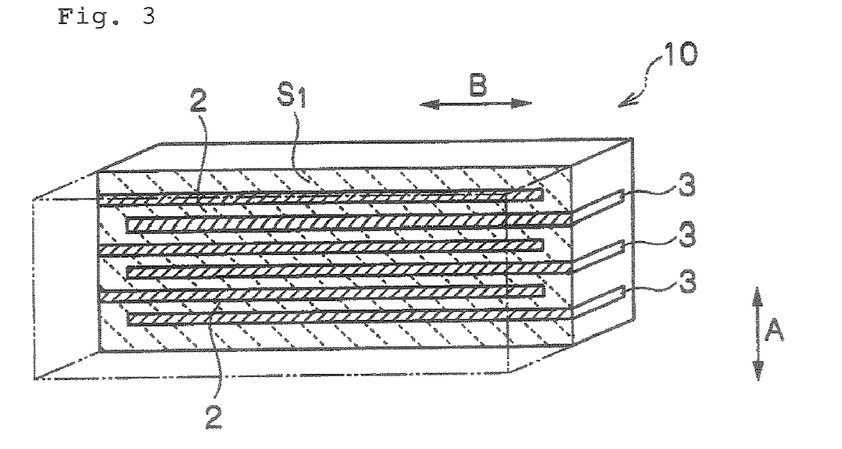
FIG. 3 is a perspective view for explain of "the exposed face" in the multilayer ceramic capacitor of the first aspect and the second aspect according to the present invention.

In the present invention, the residual stress in the layered dielectric body 10 means a residual stress measured on a exposed face appearing at a time when the dielectric element body 10 is ground to its center portion or near, and the exposed face parallel to the direction of the electric field is a face "S1" appearing at a time when the grinding the layered dielectric body 10 in parallel to the electric field direction denoted by an arrow "A" in FIG. 3.

Further, the electric field direction mentioned herein is a normal direction as shown by the arrow "A" in FIG. 3, that is, the lamination direction of the dielectric layers 2 and the internal electrode layers 3.

Accordingly, a residual stress in a direction of an electric field in a face parallel to the direction of the electric field inside the layered dielectric body 10 is the tension stress measured in a exposed face "S1" appearing by grinding the layered dielectric body 10 to the center portion or near thereof in parallel to the electric field direction. The tension stress is calculated by the X-ray diffraction measurement is a residual stress of a plus value.

In the multilayer ceramic capacitor 1 of this aspect, it is desired that the tension stress has an upper limit of about 500 MPa. In the case of the tension stress exceeding this upper limit, a structural defect may occur.

(2) Second Aspect

In the multilayer ceramic capacitor 1 of this second aspect, the residual stress in a direction connecting both the external electrodes 4 (direction of arrow B in FIG. 2) at a face parallel to the direction of the electric field inside the layered dielectric body 10 is a compression stress calculated not less than 50 MPa by an X-ray diffraction measurement. Since a value of the compression stress changes in accordance with the thickness of the layered dielectric body 10 constituting the multilayer ceramic capacitor 1, grain size of the dielectrics of the dielectric layers 2, the number of lamination of the dielectric layers 2, and the characteristics of the internal electrode layers 3, the range of the value of the compression stress is not definitively prescribed. But in the case of the compression stress of not less than 50 MPa in the direction extending to the both end, the dielectric constant of the multilayer ceramic capacitor 1 becomes high and the capacitance becomes large. It is desired that the compression stress is not less than 100 MPa, and more preferably, not less than 200 MPa. In the case of the compression stress of less than 50 MPa, there may cause a case that the dielectric constant becomes low and a desired capacitance is not obtainable.

In the present invention of this second aspect, the explanations made above in connection with the first aspect will be applicable to the residual stress in the layered dielectric body 10 and the exposed face parallel to the direction of the electric field. In this second aspect, the direction connecting to the both the external electrode corresponds to the direction along which the paired external electrodes 4 are opposed to each other (see arrow "B" in FIG. 2), in usual, it means the longitudinal direction of the surface seen in a plan view of the layered dielectric body. In the present application, this direction may be called the direction extending to the both external electrodes.

Accordingly, the residual stress in the direction extending to the both external electrodes in the exposed face parallel to the direction of the electric field in the layered dielectric body 10 is a residual stress measured in a exposed face "S1" appearing by grinding the layered dielectric body 10 to the center portion or near thereof in parallel to the electric field direction as shown in FIG. 3. The compression stress is calculated as a residual stress of a minus value by the X-ray diffraction measurement.

In the multilayer ceramic capacitor 1 of this aspect, it is desired that the compression stress has an upper limit of about 600 MPa. In the case of the compression stress exceeding this upper limit, a structural defect may occur.

(3) Third Aspect

In the multilayer ceramic capacitor 1 of this third aspect, the residual stress in a direction extending to the both end, i.e., the direction between the terminals, in a surface of the layered dielectric body 10 perpendicular to the direction of the electric field therein is a compression stress calculated not less than 100 MPa by an X-ray diffraction measurement. In this third aspect, since a value of the compression stress changes in accordance with the thickness of the layered dielectric body 10 constituting the multilayer ceramic capacitor 1, grain size of the dielectrics of the dielectric layers 2, the number of lamination of the dielectric layers 2, and the characteristics of the internal electrode layers 3, the range of the value of the compression stress is not definitively prescribed. But in the case of the compression stress of not less than 100 MPa in the direction extending to the both end, the dielectric constant of the multilayer ceramic capacitor 1 becomes high and the capacitance becomes large. It is desired that the compression stress is not less than 200 MPa, and more preferably, not less than 400 MPa. In the case of the compression stress of less than 100 MPa, there may cause a case that the dielectric constant becomes low and a desired capacitance is not obtainable.

Figure 4:
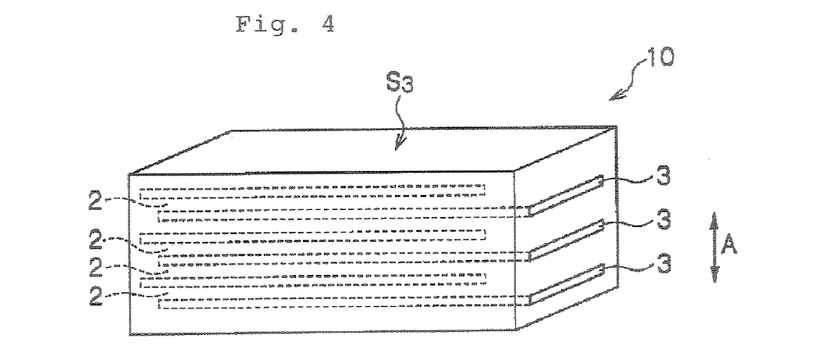
FIG. 4 is a perspective view for explain of "the outer surface" in the multilayer ceramic capacitor of the third aspect and the fourth aspect according to the present invention.

In the present invention of this third aspect, the outer surface of the layered dielectric body 10 perpendicular to the direction of the electric field therein is an upper surface "S3" in FIG. 4 or under surface of the layered dielectric body 10 cannot be seen in FIG. 4, in a case the laminated dielectric body 10 is placed so as to the direction of the electric field therein is parallel to the vertical direction (see arrow "A" in FIG. 4). The under surface is exactly a surface as viewed from bottom.

Accordingly, in this third aspect, the residual stress in the direction connecting to the both external electrodes in the surface of the layered dielectric body 10 perpendicular to the direction of the electric field therein is a residual stress in the direction connecting to the both external electrodes measured in the upper or under surface of the dielectric element body 10. In this third aspect, the direction connecting to the both external electrode corresponds to the direction along which the paired external electrodes 4 are opposed to each other (see arrow "B" in FIG. 4), i.e., the direction between the terminals, and in usual, this direction accords with the longitudinal direction of the outer surface in a plan view of the layered dielectric body 10. The compression stress is calculated as a residual stress of a minus value by the X-ray diffraction measurement.

In the multilayer ceramic capacitor 1 of this aspect, it is desired that the compression stress has an upper limit of about 1000 MPa. In the case of the tension stress exceeding this upper limit, a structural defect may occur.

(4) Fourth Aspect

In the multilayer ceramic capacitor 1 of this fourth aspect, the following equations are satisfied.

$$LS = -Ln(n) \times B, \quad 10 \leq B \leq 300$$

Wherein n number of dielectric layers; B: constant of proportion; LS: a value of a residual stress in a direction connecting to the both external electrodes at an outer surface of the layered dielectric body 10 perpendicular to the direction of the electric field therein calculated by an X-ray diffraction measurement; and Ln: natural logarithm. It is preferred that the equation of $50 \leq B \leq 200$ is satisfied.

These relations indicate that as the number of the dielectric layers 2 increases, the compression stress in the surface of the layered dielectric body 10 in the plan view increases.

The constant B of proportion relates to dimensions of the layered dielectric body 10 constituting the multilayer ceramic capacitor 1 of the present invention For example, (i) in a case where the layered dielectric body 10 has dimensions of 3.0 to 3.4 mm (long side length)×1.0 to 1.8 mm (short side length)× 0.8 to 1.8 mm (height length), the equation of $50 \leq B \leq 200$ is satisfied, and the number of the dielectric layers 2 is about 100 to 1000, the residual stress LS is a compression stress of not less 200 MPa and not more than 1500 MPa; (ii) in a case where the layered dielectric body 10 has dimensions of 1.8 to 2.2 mm (long side length)×1.0 to 1.4 mm (short side length)× 0.8 to 1.4 mm (height length), the equation of $50 \leq B \leq 200$ is satisfied, and the number of the dielectric layers 2 is about 50 to 500, the residual stress LS is a compression stress of not less than 200 MPa and not more than 1200 MPa; and (iii) in a recent case where small size and high capacitance are required, and the layered dielectric body 10 has dimensions of 0.8 to 1.2 mm (long side length)×0.4 to 0.6 mm (short side length)×0.4 to 0.7 mm (height length), the equation of $50 \leq B \leq 200$ is satisfied, and the number of the dielectric layers 2 is 50 to 300, the residual stress LS is compression stress of not less than 100 MPa and not more than 1000 MPa.

In the multilayer ceramic capacitors of the first to fourth aspects of the present invention, as the residual stress of the layered dielectric body increases, the dielectric constant becomes high. As a result, even if it is intended to miniaturize the multilayer ceramic capacitor, the capacitance can be enlarged by applying the predetermined residual stress of the value mentioned above to the dielectric element body.

The reason why the dielectric constant of the multilayer ceramic capacitor becomes high by applying the residual stress to the layered dielectric body is not necessarily clear at a time when the subject application (basic Japanese patent application) was filed, but is considered as that the crystals are orientated by the residual stress. This will be related to a case where the residual stress was not caused and the dielectric constant was low in a sample having the same shape as the layered dielectric body 10 and no internal electrode layer, i.e., having only the dielectric layers.

When each of the electric layer 2 sandwiched with two internal electrode layers 3 has a thickness of not more than 5 μm and has an average grain size of dielectrics is not more than 0.6 μm, an average grain size of conductive material in each of the internal electric layers 3 is not larger than the average grain size of dielectrics, and a lamination number of the dielectric electric layers 2 is not less than 50, a multilayer ceramic capacitor 10 met the first to fourth aspects of the present invention can be easily obtained.

In the prior art reference of Japanese Unexamined Patent Publication No. HEI 8-236386 mentioned hereinbefore, it is described that it is preferred that the residual stress of the multilayer ceramic capacitor is not more than 50 MPa in term of the mechanical strength. However, in the multilayer ceramic capacitor of the present invention, since the grain size of the dielectrics is not more than 0.6 μm and the thickness of the dielectric layer between two internal electrode layers is not more than 5 μm, there is no problem in mechanical strength and no crack. The reason consists in the conventional art.

[Measurement of Residual Stress]

For the measurement of the residual stress of the multilayer ceramic capacitor 1 according to the present invention, there is adopted an X-ray residual stress measuring method utilizing the X-ray diffraction method. The X-ray residual stress measuring method is a method utilizing the fact that a distance between atoms of a crystal is expanded or shrunk within the elastic limit in proportion to the force applied to the material. The residual stress is calculated by measuring the change in the distance d between the crystal surfaces by utilizing the X-ray diffraction method.

The diffraction condition of Bragg is expressed by the following equation (1) by utilizing a wavelength λ, a crystal surfaces distance d, and diffraction angle θ.

$$n \cdot \lambda = 2d \sin \theta \tag{1}$$

The amount $\in$ of strain is shown by the following equation (2) by using a variation δd of the crystal surfaces distance and variation δθ of the X-ray diffraction angle.

$$\in = \delta d/d = -\cot \theta \cdot \delta \theta \tag{2}$$

As can be seen from the above equation (2), the amount $\in$ of strain is calculated from the variation δθ of the X-ray diffraction angle. From the relationship between sin 2φ and 2θ at a time of varying the angle φ constituted by a normal line in a sample surface and a normal line in the crystal surface, the residual stress σ is expressed as following equation (3), in which E is Young's module and ν is Poisson's ratio.

$$\begin{aligned}\sigma &= E/(1+v) \cdot \delta \varepsilon(\varphi)/\delta \sin 2\varphi \\ &= -E \cot \theta / 2(1+v) \cdot \delta 2\theta / \delta \sin 2\varphi\end{aligned} \tag{3}$$

In a concrete measurement, an X-ray was irradiated to the center portion of a surface of the layered dielectric body 10 or a ground surface appearing at a time when the dielectric element body 10 is ground to its center portion or near by utilizing a micro X-ray stress measuring device with a spot diameter of 300 μm. Cr—Kα ray was used as characteristic X-ray. By changing an angle constituted by a normal line in the sample surface and a normal line in the crystal surface, the residual stress was calculated by the above equation based on a change of the diffraction angle of a peak near 2θ=129.5° of $BaTiO_3$. In the case where the residual stress of the layered dielectric body 10 is measured in a ground surface of the layered dielectric body 10 is measured, grinding strain which will be caused at the time of grinding may constitutes a problem. In the present invention, however, finishing grinding is performed by using a diamond paste having particle size of 1 μm so as to confirm that there is no influence of the grinding strain to the layered dielectric body 10 to be measured.

As mentioned hereinbefore, the multilayer ceramic capacitor 1 according to the present invention can maintain the dielectric constant of the value not less than 2500 by being applied with the residual stress mentioned above even in the case of the average crystal grain size of the dielectric layers 2 of not more than 0.6 μm, preferably, of not more than 0.45 μm, and more preferably, of not more than 0.25 μm, thus being advantageous.

(Multilayer Ceramic Capacitor Manufacturing Method)

The multilayer ceramic capacitor according to the present invention is manufactured by preparing a green chip by a usual printing method or sheet method using pastes, then sintering the green chip and coating the raw material of external electrode and then sintering it.

[Paste for Dielectric Layer]

A paste for the dielectric layers is formed by mixing a dielectric material and an organic vehicle. As the dielectric material, a powder having a composition corresponding to the composition of the dielectric layer is used.

The method of manufacturing the dielectric material is not specifically limited, and for example, there is adopted a method of mixing sub-component materials with $BaTiO_3$ synthesized by a hydrothermal synthesis method. There may be adopted a drying synthesis method in which a mixture of $BaCO_3$, $TiO_2$ and sub-component materials are calcinated to thereby perform a solid phase reaction, or the hydrothermal synthesis method may be also adopted. Furthermore, the dielectric material may be also synthesized by calcinating a mixture of the sub-component material and a precipitate of a main component obtained by co-precipitation method, sol-gel method, alkali hydrolysis method, or precipitation-mixing method. As the sub-component material, oxide and at least one of various compounds, which form oxides by being sintered, such as carbonate, oxalate, nitrate, hydroxide, organic metal compound, and the like.

The average particle size of the dielectric material will be determined in accordance with the average crystal grain size of the dielectric layer to be formed. For example, in a case of the average crystal grain size of the dielectric layer being of not more than 0.6 μm, a powder having an average particle size of not more than 0.6 μm may usually be utilized.

The organic vehicle is obtainable by dissolving at least one organic binder into an organic solvent. Such organic binder as utilized for the organic vehicle is not limited, and at least one of usual organic binders such as ethyl cellulose, butyral resin or the like may be optionally selected. The organic solvent is not specifically limited, and in accordance with a method to be utilized such as printing method, sheet method or the like, at least one of various organic solvents such as terpineol, butyl carbitol, acetone, toluene, alcohol or the like may be optionally selected.

[Paste for Internal Electrode Layer]

The paste for the internal electrode layers is manufactured by kneading or mixing the organic vehicle of the kind mentioned above with a conductive material powder composed of conductive metal or alloy mentioned above, or oxide, organic metal compounds, resin ate, or the like each of which is formed as the conductive material mentioned above after being sintered. As a conductive material powder, powder of nickel or nickel alloy having an average particle size of not more than 0.5 μm, and preferably, of not more than 0.25 μm may be utilized. By using these materials, the internal electrode was sintered with the dielectric material at the same time, the multilayer ceramic capacitor contains a large residual stress.

[Paste for External Electrode]

A paste for the external electrodes will be prepared as like as the paste for the internal electrodes, and Cu or Ni is utilized as main component thereof.

[Content of Organic Vehicle]

There is no specific limit to the content of the organic vehicle in each of the pastes, and in usual, for example, the organic binder of about 1 to 10 weight % and the organic solvent of about 10 to 50 weight % may be contained. In addition, a material or materials selected from various kinds of dispersing agents, plasticizers, dielectrics, insulating materials and the like may be added as additive(s). Particularly, it is desired to add an additive having the same composition as that of the dielectric material or the main component of the dielectric material for the dielectric layers as common material. In such case, it is desired to add the additive called "common material" by not more than 30 weight %, and desired that the average particle size thereof is smaller than that of the conductive material powder for the internal electrode layers.

[Manufacture of Green Chip]

The green chips are formed by laminating predetermined number of green sheets made of the paste for the dielectric layers, laminating predetermined number of green sheets made of the paste for the dielectric layers on each of which the paste for the internal electrode layers is applied, laminating predetermined number of green sheets made of the paste for the dielectric layers, and then cutting into a predetermined shape.

[Binder Removing Treatment Process]

The binder removing treatment process is performed before the sintering process. This binder removing treatment process will be performed under usual conditions. However, in the case where a base metal such as nickel or nickel alloy is used as conductive material for the internal electrode layers, it is desirable that such binder removing treatment is effected in an atmosphere with holding temperature of 200 to 400 degrees of C. or in a reduction atmosphere with holding temperature of 200 to 800 degrees of C.

[Sintering Process]

An atmosphere for sintering the green chip may be optionally determined in accordance with the kind of the conductive material in the paste for the internal electrode layers. In the case where a base metal such as nickel or nickel alloy is used as conductive material for the internal electrode layers, it is desirable that an oxygen partial pressure in the sintering atmosphere is $10^{-8}$ to $10^{-12}$ atm. In the case of the oxygen partial pressure of less than the above range, the conductive material of the internal electrode layers may abnormally sintere and the internal electrode layer may divided into parts. On the other hand, in the case of the oxygen partial pressure of more than the above range, the internal electrode layers tend to be oxidized.

It is desired for the holding temperature during the sintering process to be in a range of 1000 to 1350 degrees of C. In the case of the holding temperature of less than the above range, the compaction is not sufficiently performed in the layers, and on the other hand, in the case of the holding temperature of more than the above range, Ni is easily spheroidized and the capacitance decrease.

Conditions other than those mentioned above are: temperature-up speed of 50 to 500 degrees of C. per hour, particularly of 200 to 300 degrees of C. per hour; duration of holding temperature of 1 to 3 hours; cooling down speed of 50 to 500 degrees of C. per hour, particularly of 200 to 300 degrees of C. per hour, and the sintering atmosphere is desired to be the reduction atmosphere. It is further desired to use a humidified mixture gas of nitrogen ($N_2$) and hydrogen ($H_2$) as the atmosphere gas.

[Annealing Treatment Process]

It is desired to carry out an annealing treatment process to the layered dielectric body in the case after the sintering process is carried out in the reduction atmosphere. The purpose of annealing treatment is re-oxidizing the dielectric layers, and according to such treatment, the IR accelerated life time can be extremely expanded.

It is desired that the oxygen partial pressure during the annealing treatment process is a value of not less than $10^{-7}$ atm. In the case of less than this value, it becomes difficult to re-oxidize the dielectric layers and, on the other hand, in the case of more than this value, the internal electrode layers tend to be oxidized.

It is also desired that the holding temperature during the annealing treatment is not more than 1200 degrees of C., and preferably, in a range of 900 to 1200 degrees of C. In the case of the holding temperature less than the above range, the oxidization of the dielectric layers becomes insufficient and the life time of the multilayer ceramic capacitor will become shortened. On the other hand, in the case of the holding temperature more than the above range, the internal electrode layers are oxidized and the capacitance is deteriorated, and in addition, the internal electrode layers will react to the dielectrics of the dielectric layers to thereby shorten the life time of the multilayer ceramic capacitor. The annealing treatment process may be carried out in terms of temperature-up and temperature-down. In such case, the duration of holding temperature is zero and, hence, the holding temperature corresponds to the maximum temperature.

Other conditions than those mentioned above are as follows: duration of holding temperature: 0 to 20 hours and preferably of 2 to 10 hours; cooling down speed: 50 to 500 degrees of C. per hour and preferably of 100 to 300 degrees of C. per hour; and atmosphere gas: humidified $N_2$ gas or the like.

In the respective processes of the binder removing treatment, sintering treatment and the annealing treatment mentioned above, the humidifying of the $N_2$ gas or the mixture gas is carried out by using a wetter, for example, and in such case, it is desirable for water in the wetter to have a temperature of 5 to 75 degrees of C. These processes of the binder removing treatment, sintering treatment and the annealing treatment mentioned above may be carried out continuously or separately from each other.

[Formation of External Electrode]

The external electrodes are formed by carrying out, for example, barrel grinding or sandblast grinding, grinding operation to the end surfaces of the layered dielectric body obtained by the manner mentioned above, printing or transferring the paste for the external electrodes to the end surfaces ground, and sintering these pastes. It may be desired that the sintering operation of the paste for the external electrodes is carried out in a humidified $N_2$ and $H_2$ mixture gas atmosphere at a temperature of about 600 to 800 degrees of C. and for about 10 to 60 min. As occasion demands, the surface of the external electrode thus formed may be plated so as to form a coating layer.

The multilayer ceramic capacitor of the present invention manufactured in the manner mentioned above is, for example, mounted by soldering or the like on a printed circuit board or the like and utilized for various electronic equipment or the like.

Exemplary Embodiment

Hereunder, the present invention will be described more in detail with reference to exemplary embodiments.

First Experiment 1

Pastes for the dielectric layers, the internal electrode layers and the external electrodes were firstly prepared as follows.

Paste for Dielectric Layers $(MgCO_3)_4 \cdot Mg(OH)_2 \cdot 5H_2O$, $MnCO_3$, $BaCO_3$, $CaCO_3$, $SiO_2$, $Y_2O_3$, and $V_2O_5$ were added to $Ba_{1.005}TiO_3$ manufactured by the hydrothermal synthesis method, which are then wet-blended by a ball mill for 16 hours to thereby obtain a dielectric material containing, as final composition, $Ba_{1.005}TiO_3$ of 100 mol %, MgO of 2 mol %, MnO of 0.4 mol %, $Y_2O_3$ of 2 mol %, $V_2O_5$ of 0.01 mol %, and $Ba,Ca)SiO_3$ of 3 mol %. Then, the dielectric material of 100 unit weights, acrylate resin of 4.8 unit weights, methylene chloride of 40 unit weights, trichloroethane of 20 unit weights, mineral spirit of 6 unit weights, and acetone of 4 unit weights were mixed and kneaded in the ball mill to obtain a paste for the dielectric layers.

Paste for Internal Electrode Layers

Ni powder of average particle size of 0.4 μm of 100 unit weights, organic vehicle (prepared by dissolving ethyl cellulose resin of 8 unit weights in butyl carbitol of 92 unit weights) of 40 unit weights, and butyl carbitol of 10 unit weights were kneaded by three rolls into a paste state, thus being prepared a paste for the internal electrode layers. In addition, the pastes for the internal electrode layers were also manufactured by using Ni powders of average particle size of 0.1 μm, 0.2 μm, 0.3 μm, 0.4 μm, 0.5 μm and 0.6 μm, respectively, and then, influence of the Ni powders to the residual stress was considered.

Paste for External Electrodes

Cu particles of average particle size of 0.2 μm of 100 unit weights, organic vehicle (prepared by dissolving ethyl cellulose resin of 8 unit weights in butyl carbitol of 92 unit weights) of 35 unit weights, and butyl carbitol of 7 unit weights were kneaded into a paste state, thus being prepared a paste for the external electrodes.

Next, a multilayer ceramic capacitor such as shown in FIG. 1 was prepared by using the paste for the dielectric layer, the paste for the internal electrode layers, and the paste for the external electrodes mentioned above.

First, the dielectric layer paste was applied on a PET (polyethylene terephthalate) film to thereby form a green sheet having a thickness of 5 μm. On this green sheet, the internal electrode paste was printed, and then, the sheet was peeled off from the PET film. A plurality of sheets, each being formed in the above manner, was laminated. A protection sheet being composed of only dielectric layers applied with no internal electrode paste printing and having a thickness of 200 μm is laminated on both uppermost and lowermost surfaces of the above laminated sheets, respectively. The thus laminated structure was bonded under pressure and obtained as a green laminated layer structure. In the described manner, five kinds of green laminated layer structures were prepared, which have effective dielectric lamination layers of 10 layers, 20 layers, 50 layers, 100 layers and 200 layers, respectively. The thus prepared green laminated layer structures were cut into predetermined size as green chips, to which the binder removing treatment, the sintering treatment and annealing treatment were continuously performed under the following conditions. Thus, the laminated dielectric element bodies were prepared.

For the following conditions, a wetter being set water temperature of 35 degrees of C. was used for humidifying the atmosphere gas.

Binder removing condition - - - temperature-up speed: 15 degrees of C. per hour; holding temperature: 280 degrees of C.; duration of holding temperature: 8 hours; and atmosphere gas: air.

Sintering condition - - - temperature-up speed: 200 degrees of C. per hour; holding temperature: 1240 degrees of C.; duration of holding temperature: 2 hours; cooling down speed: 200 degrees of C. per hour; atmosphere gas: humidified mixture gas of $N_2$ and $H_2$; and oxygen partial pressure: $10^{-9}$ atmospheric pressure.

Annealing condition - - - holding temperature: 1100 degrees of C.; duration of holding temperature: 3 hours; cooling down speed: 200 degrees of C. per hour; atmosphere gas: humidified $N_2$; and oxygen partial pressure: $10^{-5}$ atmospheric pressure.

The end surfaces of the thus prepared and obtained laminated dielectric element bodies were ground by the sand blasting method, and the pastes for the external electrodes prepared in the manner mentioned above were transferred to the end surfaces, which were then sintered in the humidified mixture gas of $N_2$ and $H_2$ atmosphere at 800 degrees of C. for 10 minutes. Thus forming the external electrodes and obtaining samples of five kinds of multilayer ceramic capacitors having dielectric layers of 10 layers, 20 layers 50 layers 100 layers and 200 layers. Each of these samples had a size (dimensions) of 3.2 mm×1.6 mm×0.6 mm, the thickness of the dielectric layer thereof was 3 μm and the thickness of the internal electrode layer was 1.5 μm. The average crystal grain size of the dielectrics was 0.35 μm, which was calculated by utilizing a photograph of a sample section taken by the scanning electron microscope.

The capacitance was measured by using an LCR meter, i.e., reactance, capacitance, and resistance measuring equipment, under the conditions of 1 KHz and 1 Vrms.

[Measurement and Result of Residual Stress]

The residual stresses were measured by using an X-ray diffraction device of KABUSHIKI KAISHA RIGAKU and utilizing the equations (1) to (3) mentioned above, Young's modulus of 162800 MPa, Poisson's ratio of 0.244, and constant of stress of −537.4.

Next, five kinds of samples having different number of dielectric layers as mentioned above were measured in connection with the lamination number of the dielectric layers and the residual stresses, respectively. The result of measurement is shown in the following Table 1.

In Table 1, the residual stress in the "electric field direction in inside" means the residual stress in the direction to the electric field in a surface parallel to the direction of the electric field, the surface appearing at a time when the dielectric element body is ground to its center portion or near, in the layered dielectric body. The residual stress in the "direction between the terminals in inside" in Table 1 means the residual stress in the direction extending to the both end, at which the external electrodes are disposed, in a surface parallel to the direction of the electric field, the surface appearing at a time when the dielectric element body is ground to its center portion or near, in the layered dielectric body. The residual stress in the "direction between terminals on a surface" in Table 1 means the residual stress in the direction extending to the both end in an outer-surface of the layered dielectric body perpendicular to the direction of then electric field therein. The stress is usually expressed as a minus value in compression stress and as a plus value in tension stress.

TABLE 1

| Number of dielectric layers | Residual Stress (MPa) | | | Capacitance (μF) |
|---|---|---|---|---|
| | direction between terminals on a surface | electric field direction in inside | direction between the terminals in inside | |
| 200 | −409.2 | 238.8 | −161.7 | 3.53 |
| 100 | −278.8 | 123.3 | −92.7 | 1.62 |
| 50 | −124.3 | 113.5 | −45.8 | 0.76 |
| 20 | −61.2 | 88.2 | −20.4 | 0.31 |
| 10 | −9.9 | 59.8 | −19.0 | 0.14 |

As is apparent from the above Table 1, tension stress was seen in the electric field direction in inside, but the compression stress was seen in the other directions. The respective residual stresses became large as the number of the dielectric layers increases. As the number of the dielectric layers increases, the capacitance measured by the multilayer ceramic capacitors using the same composition dielectric layer is also increased. In Table 1, the multilayer ceramic capacitors having the dielectric layers of 10 layers or 20 layers are comparison examples, in each of which the residual stresses in the direction between terminals on a surface and the direction between the terminals in inside are expressed with small values.

Next, the relationships among the average particle sizes of the Ni powders, the residual stresses and the capacitance were measured with respect to the multilayer ceramic capacitors obtained by forming the inner electrode layers with the paste for the inner electrode layers including the Ni powder having different average particle size. Table 2 shows the measurement result.

TABLE 2

| Average particle size of Ni Powder (μm) | Residual Stress (MPa) | | | Capacitance (μF) |
|---|---|---|---|---|
| | direction between terminals on a surface | electric field direction in inside | direction between the terminals in inside | |
| 0.1 | −330.9 | 172.9 | −174.4 | 1.74 |
| 0.2 | −301.5 | 155.8 | −147.9 | 1.73 |
| 0.3 | −294.1 | 141.6 | −125.6 | 1.68 |
| 0.4 | −278.8 | 123.3 | −92.7 | 1.62 |
| 0.5 | −252.2 | 105.2 | −82.3 | 1.55 |
| 0.6 | −195.5 | 87.6 | −58.2 | 1.51 |

As is apparent from the result of the Table 2, the residual stress and capacitance of the multilayer ceramic capacitor show large values when the average particle size of the Ni powder is not more than 0.5 μm.

The present invention is not limited to the described embodiment and many other changes and modifications may be made without departing from the disclosure of the specification and the scopes of the appended claims.

The invention claimed is:

1. A multilayer ceramic capacitor comprising:
a layered dielectric body composed by alternately dielectric layers; and internal electrode layers, the layered dielectric body having 50 layers or more; and
a pair of external electrodes connecting to the internal electrodes alternately at the both ends of the layered dielectric body, wherein the dielectric layers comprise a barium titanate as a main component, sintering aids, a first sub-component and a second sub-component, the sintering aids comprising silicon oxide as a main component and at least one of an M oxide (M is at least one element selected from a group consisting of Ba, Ca, Sr and Mg), lithium oxide and boron oxide, the first sub-component comprising at least one of oxides selected from magnesium oxide, calcium oxide, barium oxide, strontium oxide and chromium oxide, the second sub-component comprising one of R1 oxides (R1 is at least one element selected from a group of consisting of Sc, Er, Tm, Yb, Lu, Y, Dy, Ho, Tb, Gd and Eu), wherein the internal electrode layer is made of a nickel or nickel alloy, and an average particle size of a raw material powder for the internal electrode layer is smaller than an average particle size of a raw material powder for the dielectric layers, the average particle size of the raw material powder for the internal electrode layer being more than 0 and not more than 0.3 μm, the average particle size of the raw material powder for the dielectric layers being more than 0 and not more than 0.45 μm, wherein a thickness of each internal electrode layer is more than 0.2 μm and not more than 2.5 μm, and a thickness of each dielectric layer is more than 0.5 μm and not more than 5 μm, where in a tension stress in a direction of an electric field remains at a exposed face parallel to the direction of the electric field inside the layered dielectric body and the tension stress calculated by an X-ray diffraction measurement is a value not less than 50 MPa.

2. The multilayer ceramic capacitor according to claim 1, wherein said dielectric layers further contain at least one selected from $V_2O_5$, $MoO_3$, and $WO_3$ as a third sub-component.

3. The multilayer ceramic capacitor according to claim 2, wherein said dielectric layers contain at least one selected from MnO and $Cr_2O_3$ as a fourth sub component.

4. The multilayer ceramic capacitor according to claim 1, wherein the layered dielectric body has 100 layers or more, the average particle size of the raw material powder for the internal electrode layer being more than 0 and not more than 0.2 μm, and the average particle size of the raw material powder for the dielectric layers being more than 0 and not more than 0.35 μm.

5. The multilayer ceramic capacitor according to claim 1, wherein the first and second sub-components comprise one or more oxide selected from magnesium oxide, yttrium oxide, barium oxide, and calcium oxide, the dielectric layers comprise 2 to 12 mol of silicon oxide that is expressed by a molecular formula, $SiO_2$, 0.1 to 3 mol of magnesium oxide that is expressed by a molecular formula, MgO, exceeding 0 mol to 5 mol or less yttrium oxide that is expressed by a molecular formula, $Y_2O_3$, and total 2 to 12 mol of barium oxide and calcium oxide that are expressed by a molecular formula, BaO and CaO, respectively, with respect to 100 mol of barium titanate that is expressed by a molecular formula, $BaTiO_3$.

6. A multilayer ceramic capacitor comprising:

a layered dielectric body composed by alternately dielectric layers; and internal electrode layers, the layered dielectric body having 50 layers or more; and a pair of external electrodes connecting to the internal electrodes alternately at the both ends of the layered dielectric body, wherein the dielectric layers comprise a barium titanate as a main component, sintering aids, a first sub-component and a second sub-component, the sintering aids comprising silicon oxide as a main component and at least one of an M oxide (M is at least one element selected from a group consisting of Ba, Ca, Sr and Mg), lithium oxide and boron oxide, the first sub-component comprising at least one of oxides selected from magnesium oxide, calcium oxide, barium oxide, strontium oxide and chromium oxide, the second sub-component comprising one of R1 oxides (R1 is at least one element selected from a group of consisting of Sc, Er, Tm, Yb, Lu, Y, Dy, Ho, Tb, Gd and Eu), wherein the internal electrode layer is made of a nickel or nickel alloy, and an average particle size of a raw material powder for the internal electrode layer is smaller than an average particle size of a raw material powder for the dielectric layers, the average particle size of the raw material powder for the internal electrode layer being more than 0 and not more than 0.3 μm.

the average particle size of the raw material powder for the dielectric layers being more than 0 and not more than 0.45 μm, wherein a thickness of each internal electrode layer is more than 0.2 μm and not more than 2.5 μm, and a thickness of each dielectric layer is more than 0.5 μm and not more than 5 μm, wherein a compression stress in a direction connecting both the external electrodes remains at a exposed face parallel to the direction of the electric field inside the layered dielectric body and the compression stress calculated by an X-ray diffraction measurement is a value not less than 50 MPa.

7. The multilayer ceramic capacitor according to claim 6, wherein said dielectric layers further contain at least one selected from $V_2O_5$, $MoO_3$, and $WO_3$ as a third sub-component.

8. The multilayer ceramic capacitor according to claim 7, wherein said dielectric layers contain at least one selected from MnO and $Cr_2O_3$ as a fourth sub component.

9. The multilayer ceramic capacitor according to claim 6, wherein the layered dielectric body has 100 layers or more, the average particle size of the raw material powder for the internal electrode layer being more than 0 and not more than 0.2 μm, and the average particle size of the raw material powder for the dielectric layers being more than 0 and not more than 0.35 μm.

10. The multilayer ceramic capacitor according to claim 6, wherein the first and second sub-components comprise one or more oxide selected from magnesium oxide, yttrium oxide, barium oxide, and calcium oxide, the dielectric layers comprise 2 to 12 mol of silicon oxide that is expressed by a molecular formula, $SiO_2$, 0.1 to 3 mol of magnesium oxide that is expressed by a molecular formula, MgO, exceeding 0 mol to 5 mol or less yttrium oxide that is expressed by a molecular formula, $Y_{2O3}$, and total 2 to 12 mol of barium oxide and calcium oxide that are expressed by a molecular formula, BaO and CaO, respectively, with respect to 100 mol of barium titanate that is expressed by a molecular formula, $BaTiO_3$.

11. A multilayer ceramic capacitor comprising:
a layered dielectric body composed by alternately dielectric layers; and internal electrode layers, the layered dielectric body having 50 layers or more; and
a pair of external electrodes connecting to the internal electrodes alternately at the both ends of the layered dielectric body,
wherein the dielectric layers comprise a barium titanate as a main component, sintering aids, a first sub-component and a second sub-component,
the sintering aids comprising silicon oxide as a main component and at least one of an M oxide (M is at least one element selected from a group consisting of Ba, Ca, Sr and Mg), lithium oxide and boron oxide,
the first sub-component comprising at least one of oxides selected from magnesium oxide, calcium oxide, barium oxide, strontium oxide and chromium oxide,
the second sub-component comprising one of R1 oxides (R1 is at least one element selected from a group of consisting of Sc, Er, Tm, Yb, Lu, Y, Dy, Ho, Tb, Gd and Eu),
wherein the internal electrode layer is made of a nickel or nickel alloy, and an average particle size of a raw material powder for the internal electrode layer is smaller than an average particle size of a raw material powder for the dielectric layers,
the average particle size of the raw material powder for the internal electrode layer being more than 0 and not more than 0.3 μm,
the average particle size of the raw material powder for the dielectric layers being more than 0 and not more than 0.45 μm,
wherein a thickness of each internal electrode layer is more than 0.2 μm and not more than 2.5 μm, and a thickness of each dielectric layer is more than 0.5 μm and not more than 5 μm,
wherein a compression stress in a direction connecting both the external electrodes remains at an outer surface perpendicular to electric field direction of the layered dielectric body and the compression stress calculated by an X-ray diffraction measurement is a value not less than 100 MPa.

12. The multilayer ceramic capacitor according to claim 11, wherein said dielectric layers further contain at least one selected from $V_2O_5$, $MoO_3$, and $WO_3$ as a third sub-component.

13. The multilayer ceramic capacitor according to claim 12, wherein said dielectric layers contain at least one selected from MnO and $Cr_2O_3$ as a fourth sub component.

14. The multilayer ceramic capacitor according to claim 11, wherein the layered dielectric body has 100 layers or more, the average particle size of the raw material powder for the internal electrode layer being more than 0 and not more than 0.2 μm, and the average particle size of the raw material powder for the dielectric layers being more than 0 and not more than 0.35 μm.

15. The multilayer ceramic capacitor according to claim 11, wherein
the first and second sub-components comprise one or more oxide selected from magnesium oxide, yttrium oxide, barium oxide, and calcium oxide,
the dielectric layers comprise 2 to 12 mol of silicon oxide that is expressed by a molecular formula, $SiO_2$, 0.1 to 3 mol of magnesium oxide that is expressed by a molecular formula, MgO, exceeding 0 mol to 5 mol or less yttrium oxide that is expressed by a molecular formula, $Y_2O_3$, and total 2 to 12 mol of barium oxide and calcium oxide that are expressed by a molecular formula, BaO and CaO, respectively, with respect to 100 mol of barium titanate that is expressed by a molecular formula, $BaTiO_3$.

16. A multilayer ceramic capacitor comprising:
a layered dielectric body composed by alternately dielectric layers; and internal electrode layers, the layered dielectric body having 50 layers or more; and
a pair of external electrodes connecting to the internal electrodes alternately at the both ends of the layered dielectric body,
wherein the dielectric layers comprise a barium titanate as a main component, sintering aids, a first sub-component and a second sub-component,
the sintering aids comprising silicon oxide as a main component and at least one of an M oxide (M is at least one element selected from a group consisting of Ba, Ca, Sr and Mg), lithium oxide and boron oxide,
the first sub-component comprising at least one of oxides selected from magnesium oxide, calcium oxide, barium oxide, strontium oxide and chromium oxide,
the second sub-component comprising one of R1 oxides (R1 is at least one element selected from a group of consisting of Sc, Er, Tm, Yb, Lu, Y, Dy, Ho, Tb, Gd and Eu),
wherein the internal electrode layer is made of a nickel or nickel alloy, and an average particle size of a raw material powder for the internal electrode layer is smaller than an average particle size of a raw material powder for the dielectric layers,
the average particle size of the raw material powder for the internal electrode layer being more than 0 and not more than 0.3 μm,
the average particle size of the raw material powder for the dielectric layers being more than 0 and not more than 0.45 μm,
wherein a thickness of each internal electrode layer is more than 0.2 μm and not more than 2.5 μm, and a thickness of each dielectric layer is more than 0.5 μm and not more than 5 μm,
wherein a stress remains at the outer surface of layered dielectric body in a direction of perpendicular to the electric field direction, and the stress in a direction connecting both external electrodes is satisfied by the equation, $LS=-Ln(n) \times B$ and $10 \leq B \leq 300$, in which n: number of dielectric layers; B: constant of proportion; LS: a value of the stress in a direction connecting to the both external electrodes at an outer surface of the layered dielectric body perpendicular to the direction of electric field therein calculated by an X-ray diffraction measurement; and Ln: natural logarithm.

17. The multilayer ceramic capacitor according to claim 16, wherein said dielectric layers further contain at least one selected from $V_2O_5$, $MoO_3$, and $WO_3$ as a third sub-component.

18. The multilayer ceramic capacitor according to claim 17, wherein said dielectric layers contain at least one selected from MnO and $Cr_2O_3$ as a fourth sub component.

19. The multilayer ceramic capacitor according to claim 16, wherein the layered dielectric body has 100 layers or more, the average particle size of the raw material powder for the internal electrode layer being more than 0 and not more than 0.2 μm, and the average particle size of the raw material powder for the dielectric layers being more than 0 and not more than 0.35 μm.

20. The multilayer ceramic capacitor according to claim 16, wherein the first and second sub-components comprise one or more oxide selected from magnesium oxide, yttrium oxide, barium oxide, and calcium oxide, the dielectric layers comprise 2 to 12 mol of silicon oxide that is expressed by a molecular formula, $SiO_2$, 0.1 to 3 mol of magnesium oxide that is expressed by a molecular formula, MgO, exceeding 0 mol to 5 mol or less yttrium oxide that is expressed by a molecular formula, $Y_2O_3$, and total 2 to 12 mol of barium oxide and calcium oxide that are expressed by a molecular formula, BaO and CaO, respectively, with respect to 100 mol of barium titanate that is expressed by a molecular formula, $BaTiO_3$.

* * * * *